(12) United States Patent
Gabrys

(10) Patent No.: US 6,806,605 B1
(45) Date of Patent: Oct. 19, 2004

(54) PERMANENT MAGNETIC BEARING

(75) Inventor: Christopher W. Gabrys, Reno, NV (US)

(73) Assignee: Indigo Energy, Inc., Napa, CA (US)

(*) Notice: Subject to any disclaimer, the term of this patent is extended or adjusted under 35 U.S.C. 154(b) by 0 days.

(21) Appl. No.: 10/145,454

(22) Filed: May 13, 2002

Related U.S. Application Data

(60) Provisional application No. 60/291,074, filed on May 13, 2001.

(51) Int. Cl.[7] .................................................. H02K 7/09
(52) U.S. Cl. ........................................ 310/90.5; 310/90
(58) Field of Search ................................... 310/90, 90.5

(56) References Cited

U.S. PATENT DOCUMENTS

| | | | |
|---|---|---|---|
| 4,211,452 A | | 7/1980 | Poubeau |
| 4,223,240 A | | 9/1980 | Theyse |
| 5,126,610 A | | 6/1992 | Fremerey |
| 5,250,865 A | * | 10/1993 | Meeks ........................ 310/90.5 |
| 5,541,460 A | | 7/1996 | Dunfield et al. |
| 5,619,083 A | * | 4/1997 | Dunfield ..................... 310/90.5 |
| 5,763,971 A | * | 6/1998 | Takahata ..................... 310/90.5 |
| 5,912,519 A | | 6/1999 | Horner et al. |
| 6,227,817 B1 | * | 5/2001 | Paden ......................... 417/356 |
| 6,262,505 B1 | | 7/2001 | Hockney et al. |
| 6,268,674 B1 | * | 7/2001 | Takahashi ................... 310/90.5 |
| 6,388,347 B1 | * | 5/2002 | Blake ........................... 310/74 |
| 6,464,472 B1 | * | 10/2002 | Sekigushi ................... 417/351 |

* cited by examiner

*Primary Examiner*—Burton S. Mullins
*Assistant Examiner*—Iraj A. Mohandesi
(74) *Attorney, Agent, or Firm*—J. Michael Neary

(57) ABSTRACT

A magnetic bearing system for support of a body, such as an energy storage flywheel, for rotational about a substantially vertical axis of rotation through its center of mass. The bearing system includes a rotating portion and a stationary portion on each axial side of the center of mass. Two or more concentric axially magnetized ring poles on an axial surface of the rotating body are constructed of multiple individual permanent magnet pieces, arranged in rigs inside a containment cup in the end face of the rotor with radially adjacent rings having alternating magnetic polarities. On the stationary portion, two or more concentric axially magnetized pole rings of permanent magnet material cooperate with the rotating ring magnets to produce both an axial attractive force and a radial centering force.

22 Claims, 15 Drawing Sheets

PERMANENT MAGNETIC BEARING

This is related to U.S. Provisional Application No. 60/291,074 filed on May 13, 2001 and entitled Permanent Magnetic Bearing.

This invention pertains to a permanent magnetic bearing and more particularly a full levitation magnetic bearing system with an improved passive radial magnetic bearing having a rotating portion with a circumferential multi-piece construction, thereby providing maximum radial stiffness with increased operating speed capability, reduced cost and easy assembly.

BACKGROUND OF THE INVENTION

Magnetic bearings are in many cases the desired bearings for support of rotating objects especially where high-speeds, non-contamination with lubricant or bearing wear products, or long life is required. Magnetic bearings can be designed with various actively controlled degrees of freedom between one degree and five degrees. In some emerging applications, such as flywheel energy storage systems, minimizing the amount of required control is preferable for minimizing the system costs and extending the operating life. Single degree actively controlled magnetic bearing designs employ passive radial magnetic bearings to maintain radial stability. Such bearings typically have inherently low radial stiffness, however they allow very simple, reliable and long life control.

To date several different configurations of passive radial magnetic bearings have been developed and each has advantages as well as drawbacks. In applications requiring the highest speed capability, the most desirable bearing design would be one that does not use permanent magnets on the rotating portion. Permanent magnets such as NdFeB rare earth magnets and others have low tensile strengths of only about 10,000 psi. Magnets on the rotating portion would be subject to the high centrifugal loading and hence prone to fail. However, in some applications, such as those involving high vibration or higher radial and or tilt moment loading for example, it may be desirable or necessary to use a passive radial bearing design with rotating permanent magnets to achieve increased radial stiffness.

Passive radial magnetic bearing designs with magnets on both the rotor and stator portions generate the highest radial stiffness per amount of magnet material and bearing diameter, but permanent magnets on both the rotor and stator portions alone is not enough to insure the maximum radial stiffness; bearing design also affects the radial stiffness of the bearing. Some previous bearing designs have used both rotating and stationary permanent magnets but have also included steel pole rings to axially focus the magnetic flux at the axial airgaps. However, the steel pole rings allow flux redistribution at the surfaces during radial displacement of the rotor because of the high magnetic permeability of the steel pole rings. This results in a reduction in the radial stiffness of the bearings.

Other designs of passive radial magnetic bearings have achieved their maximum radial stiffness by using concentric axially magnetized permanent magnet rings attached to both the rotor and stator, with the ring magnets arranged with radially alternating polarities. The ring magnets on the rotor and stator cooperate to generate an axial attractive force as well as radial centering forces. Two or more concentric magnet rings are usually used so that maximum stiffness is achieved by all axial magnetic airgaps having surfaces bounded by permanent magnet material. For use in disk drives, such magnetic bearings use as many as four concentric magnetic pole rings for achieving the desired performance. A pivot bearing provides axial stability. Disk drives are small in diameter and operate at relatively low peripheral speed. Because the stresses in a rotating structure are a function of the peripheral speed, the ring magnets in these small bearings are subjected only to small stresses induced by centrifugal forces, so they can operate without risk of failure from those forces.

In high speed applications, such as for use in energy storage flywheels, a similar magnetic bearing design has been described that uses opposed rings of concentric axially magnetized ring magnets on the rotor and stator, with alternating polarity on radially adjacent rings. The ring magnets on the rotor are banded with high tensile strength carbon fiber/epoxy composites rings to support the ring magnets radially and bond the magnet to the inner support disk. However, even with the use of high strength banding around the magnets, the outer diameter dimension of the magnets, and hence the radial stiffness they can provide, is limited. To compensate, radial stiffness is increased by increasing the surface areas of the bearing magnets through use multiple axially tiered assemblies. FIG. 1 is a schematic representation of this type of magnetic bearing of the prior art having a passive radial magnetic bearing 30 including bearing elements 33 attached to a rotor, and bearing elements 34 attached to a stator. The rotating bearing elements 33 include permanent magnets 35 attached to the shaft 31 through use of support disks 37 and are banded with high tensile strength bands 38. The stationary bearing elements 34 include permanent magnets 36 attached to the stator housing 32 through use of spacers 39. This type of bearing requires the use of multiple precision assemblies, and it is expensive both to produce the components and to assemble them. The near zero coefficient of thermal expansion of rare earth magnets makes assembly difficult as the ring magnets can not simply be cooled and placed inside the reinforcement bands for generation of high preload. Likewise, the bands, whether metal or composite, cannot be heated to high temperatures to generate a high interference assembly because the magnets are temperature limited. Further, high stiffness carbon fiber/epoxy bands are also temperature limited and they posses low coefficients of thermal expansion, which reduces thermal interference capability. These factors complicate the manufacturing processes for producing supporting structure that can exert radial precompression in the ring magnets and thereby reduces the maximum diameter that can practically be achieved in a magnetic bearing. In addition to the high cost of the use of multiple axially stacked bearing assemblies, the multiple assemblies take up shaft space and could potentially lead to unacceptably low resonant frequencies depending on the operating speed and geometry.

SUMMARY OF THE INVENTION

The invention provides a full levitation magnetic bearing system for vertically supporting a rotor for high speed rotation on a stator, and an improved passive radial magnetic bearing that combines optimal radial stiffness with high operating speed capability and easy, low cost manufacturing and assembly. The magnetic bearing has two or more concentric, axially magnetized permanent magnet poles on both the rotor and stator that cooperate to produce axial suspending forces and radial centering forces. With permanent magnets defining the surfaces of the axial airgap, the magnetic bearing achieves the highest radial stiffness per amount of magnet material and bearing diameter. The magnetic bearings are preferably made with a diameter large enough to generate the desired radial stiffness so that multiple axially tiered assemblies are not required. Because of the large bearing diameter, the peripheral speed encountered by the rotating ring magnets can become as high as 200 m/sec or higher. To prevent failure of the rotating magnets, the rings are constructed of individual arc segments, thereby allowing the bearing ring to grow in diameter without encountering a hoop direction tensile failure as would occur with a solid ring. The pieces are radially supported inside a containment cup on the axial end of the rotating body against centrifugal forces induced by high-speed rotation. The magnet pieces are subjected only to radial compressive stresses from their compression under centrifugal force against the inner diameter of the cup. Because magnets, such as rare earth magnets that are typically used for high energy magnetic products, have a compression strength nearly fifteen times higher in compression than tension, the magnet pieces are safely loaded in the support cup. The rotating ring magnets are preferably made up of a sufficient number of pieces so that the pieces are sufficiently small in circumferential length to reduce any loading from bending or frictional tension with the cup inner diameter. The high hoop stress imparted in the cup wall from the magnet centrifugal loading is mitigated by the attachment of the cup wall to the floor or web of the cup, which distributes the load.

The magnet pieces are preferably held inside the cup using magnetic attraction by making the cup from ferromagnetic material. This allows an extremely reliable attachment method without use of adhesives that could fail, and it also makes assembly very simple. The magnet arc pieces are simply placed inside the cup, where they are magnetically attracted and securely held in place.

In one embodiment of the invention, an outer ring of electrically conductive material, such as copper, is placed between the outer rotating ring magnet pieces and the inner periphery of the cup wall. An extra ring magnet on the stator portion of similar diameter as the rotating conductive ring is provided to create a built in radial magnetic damper by producing eddy currents in the conductive ring when the rotor rotates eccentrically, thereby providing valuable radial damping for stabilizing the dynamic operation of the bearing system. The outer ring, whether used as a damper or not, can be made of a material having a lower elastic modulus than the cup or magnets to provide cushioning for the magnet pieces. The ring thereby more evenly distributes the compressive force to the magnet pieces and reduces bending stresses in the magnet pieces.

Gaps that may open during high speed rotation between the magnet pieces forming the rotating magnet rings do not cause undesirable rotating losses as one might expect. The magnet material such as NdFeB has a very low magnetic permeability and also has an electrical conductivity six times lower than steel. These factors along with the natural smoothing of the flux distribution over the axial airgap preclude significant rotating losses. Other types of permanent magnets can also be used. Because the ring magnets are constructed as smaller pieces, magnetizing the permanent magnets becomes much easier and this allows simple construction of very large bearing systems. In one embodiment, the multiple concentric magnetic poles of the rotating permanent magnets are contained in single arc pieces, with radially adjacent portions oppositely polarized. Each piece therefore contains more than one pole, which simplifies construction by replacing pieces of two or more rings with pieces of just one ring.

In a full levitation magnetic bearing system opposing passive radial and axial magnetic bearings are located on opposite ends of the levitated body. An axial magnetic thrust actuator positions the body and/or applies forces to maintain stable levitation. The passive radial magnetic bearings of the invention generate a low ratio of tilt moment instability to radial stiffness, which further enhances its use in full levitation magnetic bearing systems. One particularly beneficial application of the invention is in flywheel energy storage systems.

DESCRIPTION OF THE PREFERRED EMBODIMENT

Figure 1:
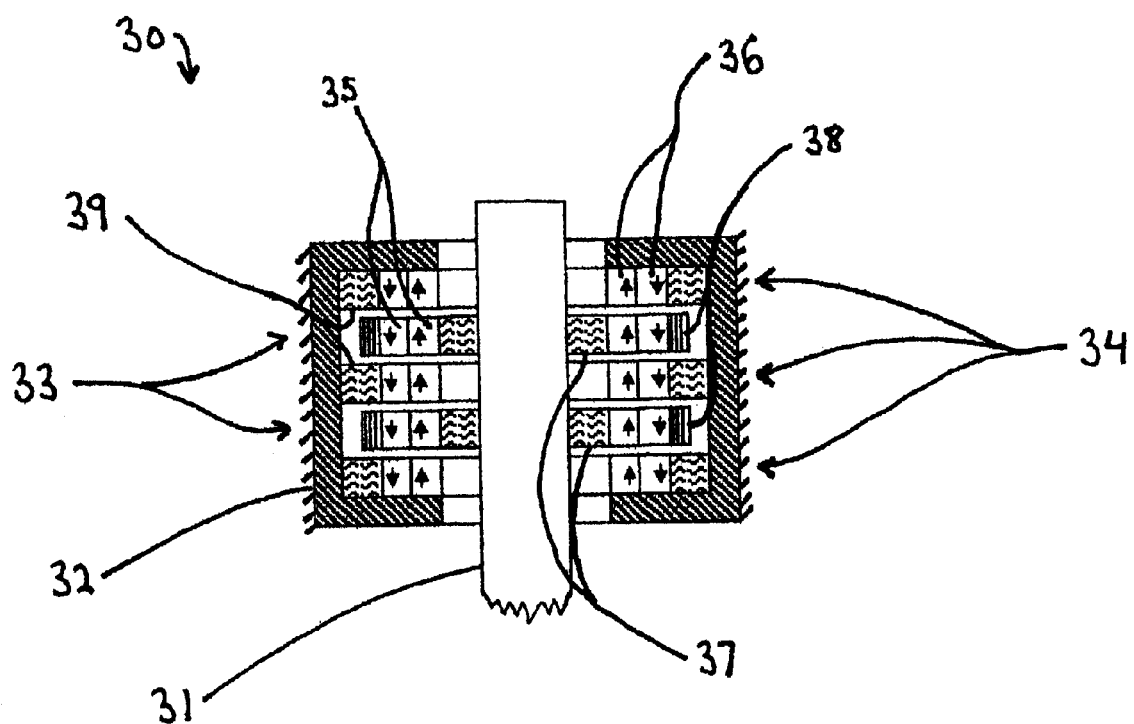
FIG. 1 is a schematic elevation of prior art passive radial magnetic bearing using multiple axially stacked assemblies.
Figure 2:
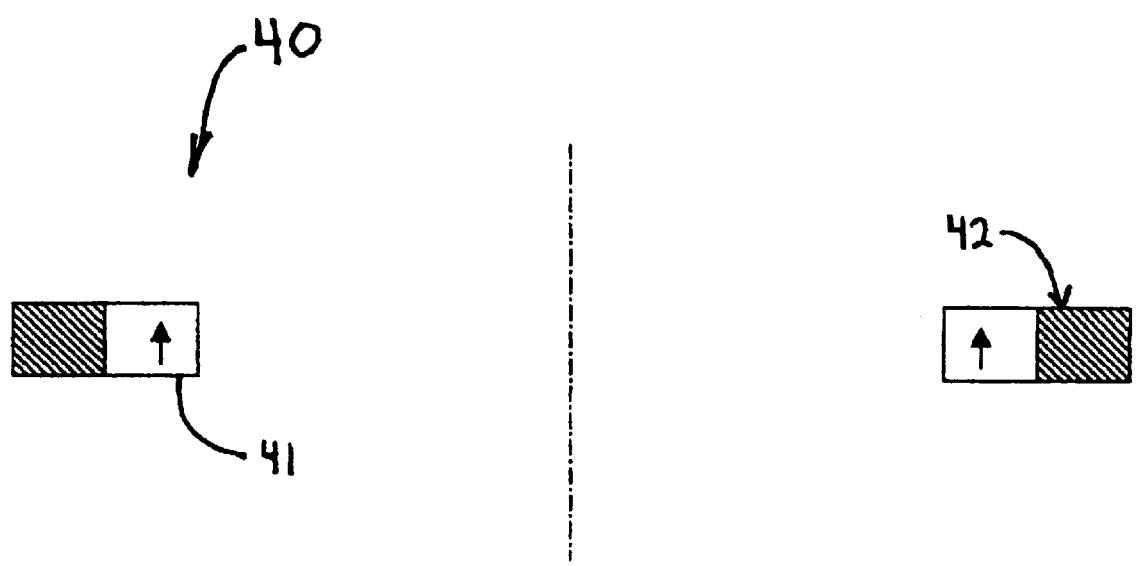
FIG. 2 is a schematic elevation of a portion of a large diameter rotor and single axial assembly passive radial magnetic bearing using only one ring magnet.

Turning now to the drawings, wherein like reference characters designate identical or corresponding parts, and more particularly to FIG. 2 thereof, a portion of a large diameter rotor is shown surrounding a single ring magnet of a passive radial magnetic bearing. The magnet bearing rotor is made with a single large diameter ring magnet 41 to provide a strong radial centering force without using multiple axially stacked assemblies. The ring magnet 41 is supported radially against centrifugal forces induced during high-speed rotation by a steel band 42. The bearing rotor is shown as an illustrative example of a large diameter rotating magnetic bearing magnet that could be used for generating high radial stiffness. The magnet 41 with an inner diameter of 4 inches and outer diameter of 5 inches is assembled inside the steel band 42 with an outer diameter of 6 inches by using a 100° C. thermal shrink fit that creates a precompression of the ring magnet 41.

Figure 3A:
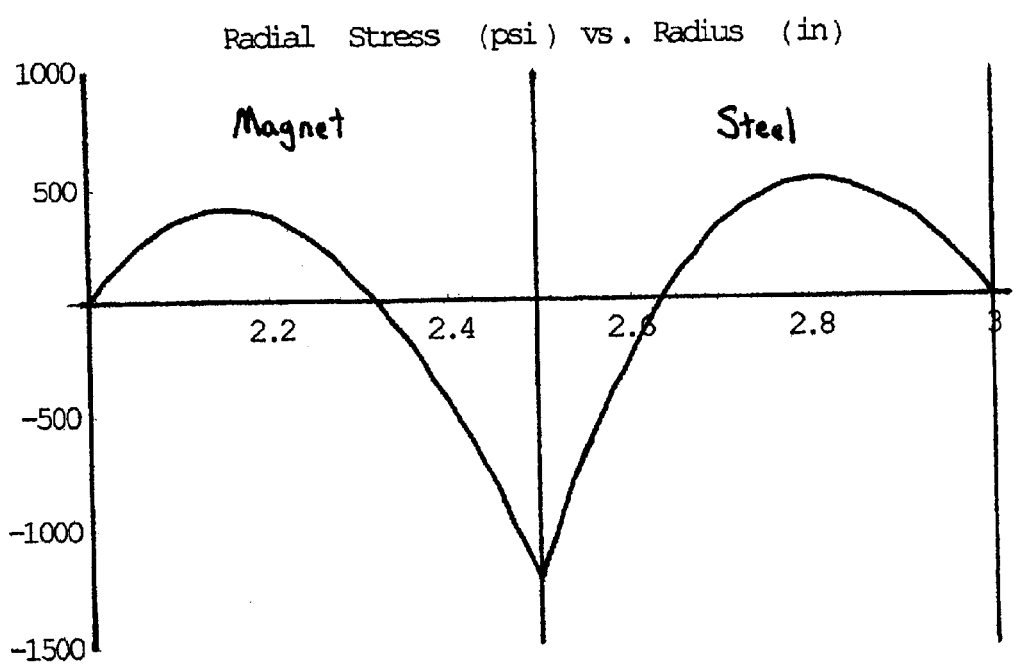
FIG. 3A is a plot showing the radial stress distribution in the large diameter passive radial magnetic bearing of FIG. 2 rotating at 35 krpm.
Figure 3B:
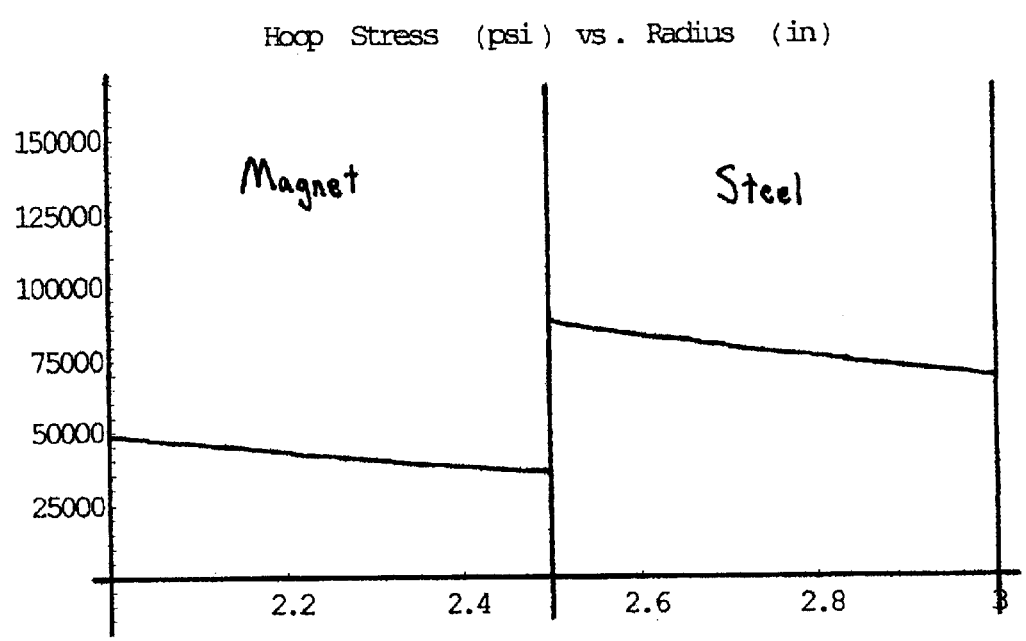
FIG. 3B is a plot showing the hoop stress distribution in the large diameter passive radial magnetic bearing of FIG. 2 rotating at 35 krpm.

Consider now that the bearing rotor 40 with its radially supported ring magnet 41 is rotated to 35,000 rpm, corresponding to a magnet peripheral speed of 232 m/sec. As shown in the radial stress distributions in FIG. 3A, the ring magnet and steel ring are in radial compression at the interface, with the maximum radial tension induced in the magnet amounting to only about 400 psi at about ⅓ of the radial distance from the inner diameter. As shown in the hoop stress distributions of FIG. 3B, the hoop stress in the magnet is exceedingly high at 50,000 psi and it would undoubtedly fail because of its low, approximately 10,000 psi strength. Thus, the magnetic bearing with simple reinforcement illustrated would be incapable of operating at high speed without failure in the configuration as shown.

A preferred configuration of a passive radial magnetic bearing 50 in accordance with the invention, shown in FIG. 4, includes a rotor portion 51 supported to rotate relative to a stationary stator portion 52. The rotor portion is preferably constructed of a high strength metal for high multidirectional strength, with steel being preferred in particular for its low cost and ferromagnetic properties. Other materials could also be used. The rotor 51 has a lower axial end portion constructed in the form of a cup having an upright peripheral rim or wall 55 and recessed inner bottom or web 56. Two or more concentric axially magnetized ring magnet poles 53 are placed in the cup against the inner periphery of the cup wall 55, preferably arranged with alternating polarities as indicated by the arrows in the magnet rings. The ring magnet poles 53 on the rotor 51 cooperate with ring magnetic poles 54 attached to the stator 52. The cooperation produces both an axial attractive force as well as a high radial centering force. Radial stiffness is maximized for the amount of magnet material and bearing diameter because the axial airgap 57 is defined by flux entering and exiting only permanent magnet surfaces. Permanent magnets have very low magnetic permeability, which prevents redistribution from radial displacement of the bearing and hence generates higher radial centering forces than magnetic bearings having steel pole pieces defining the boundaries of the airgap.

The rotating ring magnet poles 53 can be made with a large diameter and may be rotated to high speed. The ring magnets are constructed of individual arc pieces, as shown in FIG. 4B, so the arc segments of the ring magnets 53 allow the ring magnet 53 to grow radially with the rotating rotor cup wall 55 during high speed rotation without developing destructive hoop stresses that would occur in a solid ring. The individual arc segments of the ring magnet 53 are radially compressed by centrifugal force against the outer wall 55 of the containment cup. The magnet arc segments are thus subjected to radial compressive stresses. However, the radial compression strength of magnets such as NdFeB is roughly fifteen times stronger than the tensile strength and therefore they can safely survive the centrifugal force induced during high speed operation. If the cup is constructed from ferromagnetic material such as steel, the assembly of the bearing may be completed by simply placing the magnet arc pieces inside the cup, as they will be held against the bottom of the cup by magnetic attraction. Bonding could be applied, but it is unlikely to hold reliably due to the high strain mismatch between the magnet pieces and the cup, and it is unnecessary. The use of a ferromagnetic cup also provides for a low permeability path between adjacent axial magnet faces, increasing the bearing stiffness.

Figure 4A:
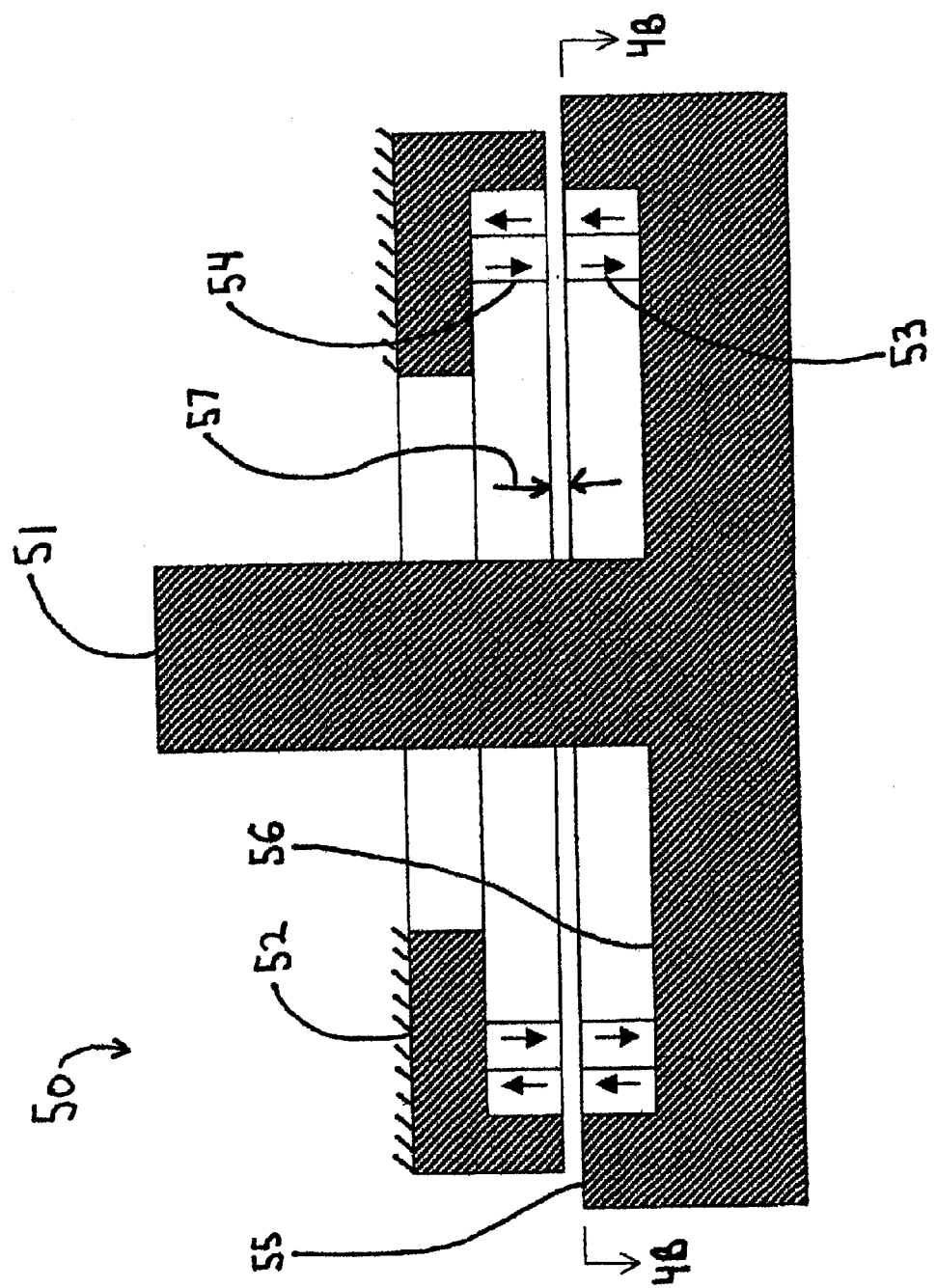
FIG. 4A is a schematic elevation of a preferred configuration of a passive radial magnetic bearing in accordance with the invention.
Figure 4B:
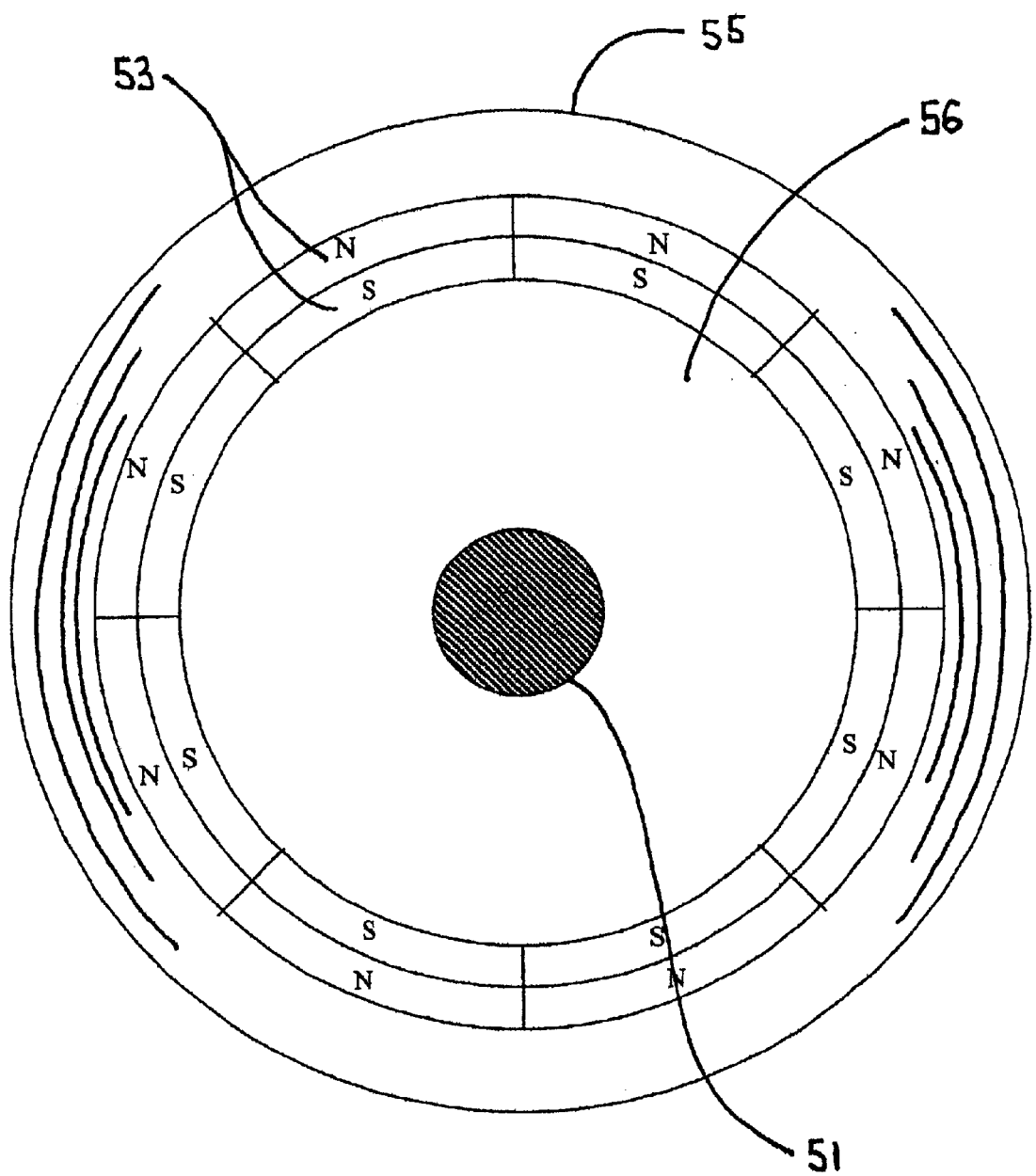
FIG. 4B is a schematic plan view along lines 4B—4B, showing the individual arc segments of which the ring magnets are made.
Figure 5A:
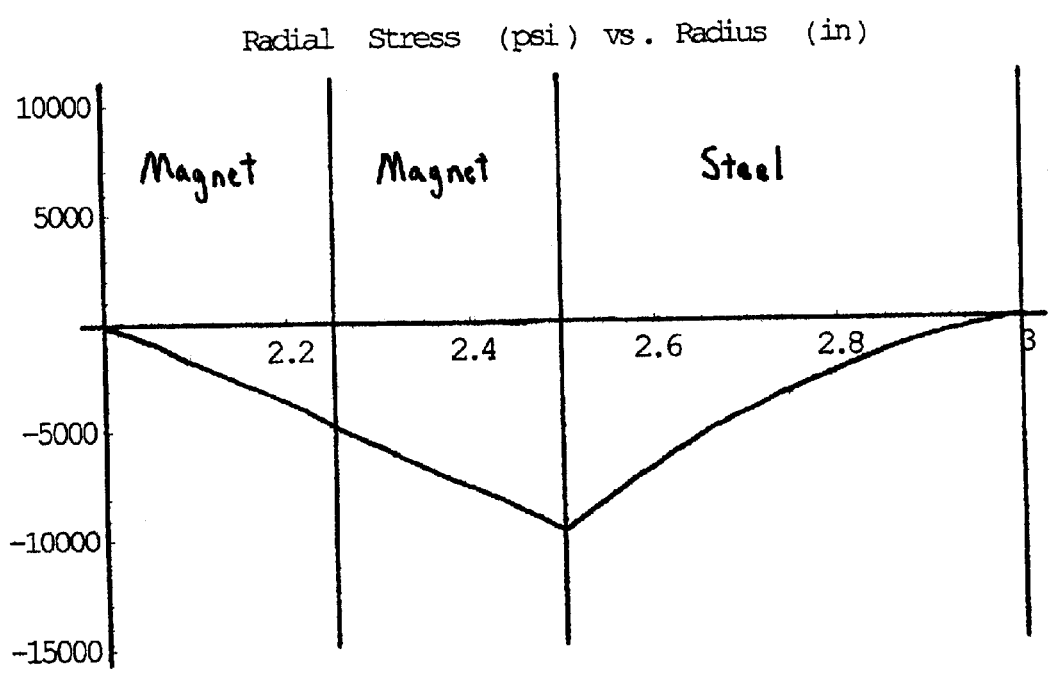
FIG. 5A is a plot showing the radial stress distribution in the rotor of the preferred configuration passive radial magnetic bearing of FIG. 4A rotating at 35 krpm.
Figure 5B:
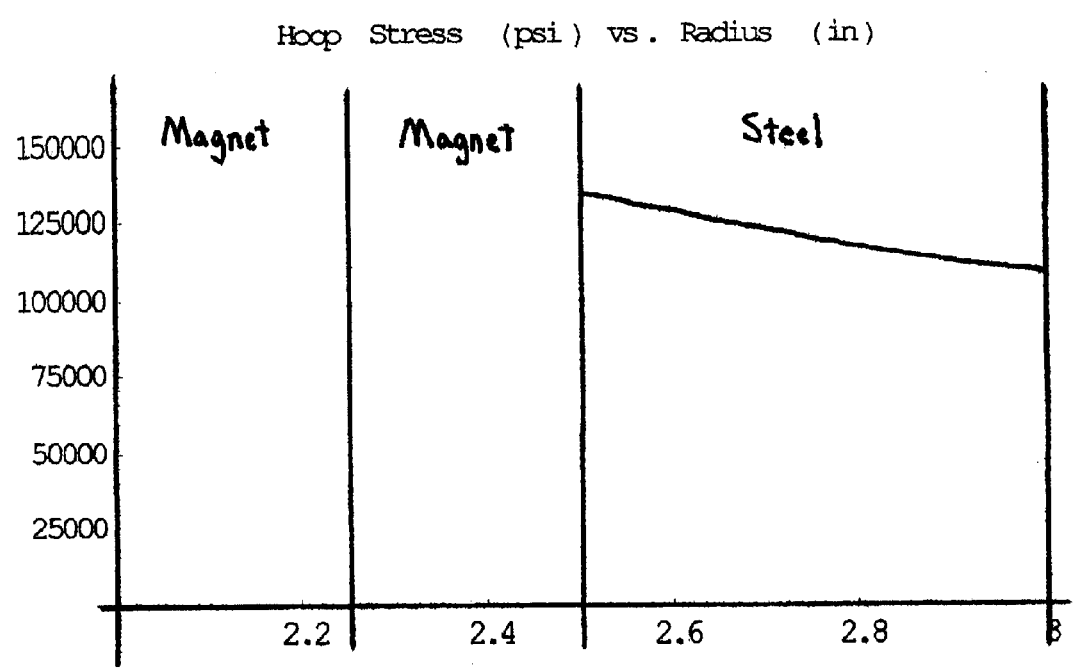
FIG. 5B is a plot showing the hoop stress distribution in the rotor of the preferred configuration passive radial magnetic bearing of FIG. 4A rotating at 35 krpm.

As shown in FIG. 5A, the radial stress distribution of the magnets in the preferred configuration passive radial magnetic bearing of FIGS. 4A and 4B rotating at 35 krpm are in radial compression throughout as is the steel cup wall 55. The hoop stress in the magnet pieces, shown in the hoop stress distributions illustrated in FIG. 5B, is essentially zero with a very high hoop tensile stress in the steel ring. The steel cup wall 55, being attached to the cup web or bottom 56, or having a longer axial dimension than the magnet pieces, reduces the hoop stress to acceptable levels by distributing the centrifugal magnet loading. For very high peripheral speed bearings, the material in the cup bottom 56 axially below the magnets, as illustrated in FIG. 4A, is preferably at least twice as thick as the magnets themselves. Peripheral or tip speeds of the magnet ring 53 in excess of 200 m/sec are feasible in this configuration.

Figure 6:
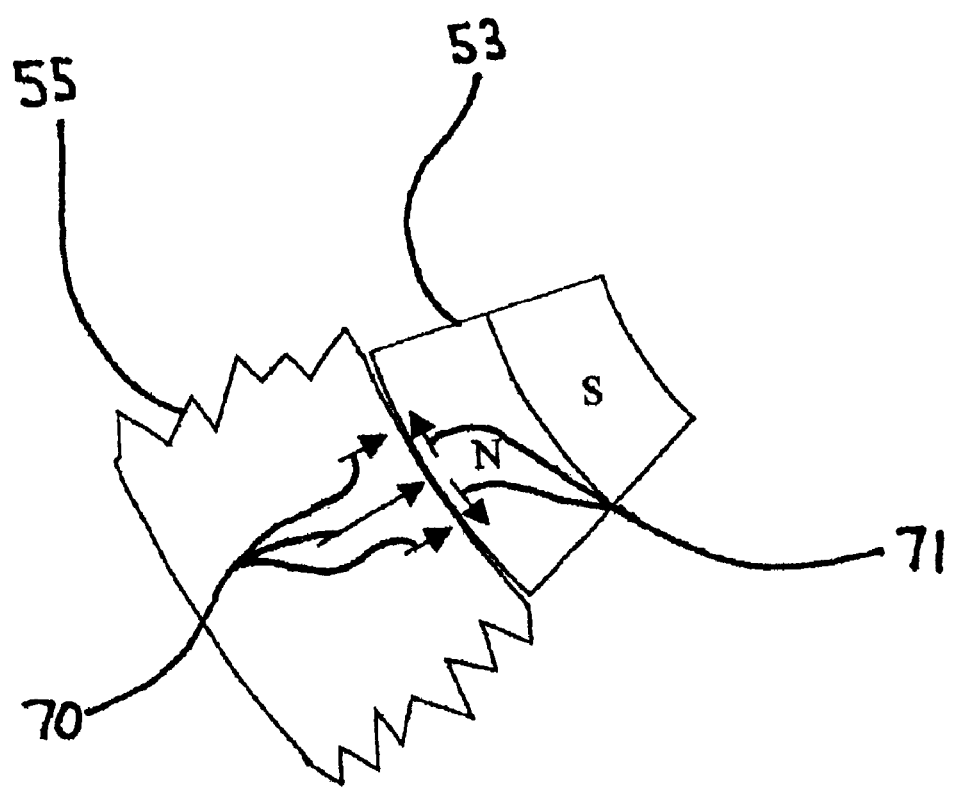
FIG. 6 is a schematic drawing of a portion of the rotor shown in FIG. 4A, showing the magnet arc piece to cup inner diameter interface during high-speed rotation.

Although hoop tensile stress is prevented in the rotating ring magnets 53 by using arc segment piece construction the magnet pieces can be subjected to tensile loading from bending and from friction induced tensile stress from the interaction with the cup. As shown in FIG. 6, the magnet arc segments 53 press up against the inner periphery of the cup wall 55 under centrifugal force. Because the ring 55, and hence its radius of curvature, grows from its hoop stress and the magnet arc 53 does not, the interface between the two does not result in a uniform pressure distribution 70. The uneven pressure 70 can result in bending stresses that could fail the magnet pieces 53. To reduce the bending stresses, the rotating ring magnet 53 should be divided into a sufficiently high number of pieces. For very high-speed rotation and with radially thick magnets, the preferred number of pieces is at least eight. The expansion of the cup wall 55 may also induce some hoop tensile loading to the magnet pieces through friction 71 at the interface. Dividing the ring magnet into many pieces mitigates this effect.

Figure 7:
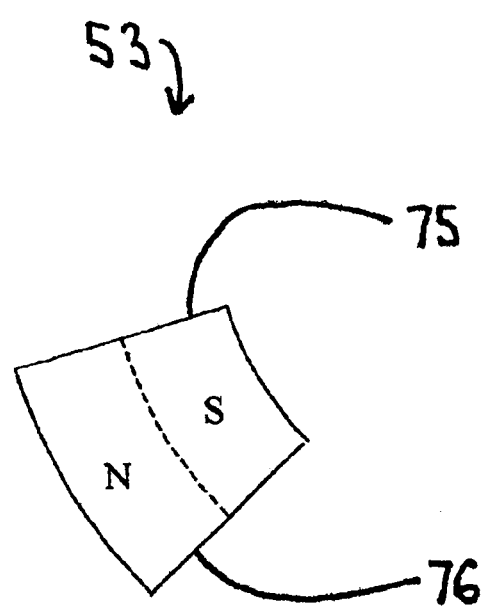
FIG. 7 is a schematic drawing of an alternative preferred configuration of magnet arc piece with multiple poles in a single piece.

In one embodiment of the invention, illustrated in FIG. 7, the two or more concentric magnetic pole rings can be made up from unitized individual magnet arc pieces by magnetizing each of the pieces with multiple poles, with just two poles 75 and 76 illustrated, but with multiple poles possible. Two magnet ring poles are required to have flux entrance to and exit from the airgap directly only from permanent magnet faces, however more ring magnet poles could be used to tailor the radial and axial stiffnesses. Likewise, the magnets need not be shaped in identical arc pieces although this facilitates lower costs. The magnets on the stator portion can be continuous rings or can be constructed of pieces, like the rotor magnets. When the magnet rings are made of pieces, the individual pieces of a single ring tend to repel each other and hence self-center the ring against a fixed outer ring structure. The ring pieces of an alternate pole inner ring will then repel each other in the hoop direction but will radially attract to the outer ring magnet pieces. Assembly and alignment are easily performed. When the rotor is rotated to high-speed, the magnets are held in radial location due to friction with the outer ring of the container cup.

Figure 8:
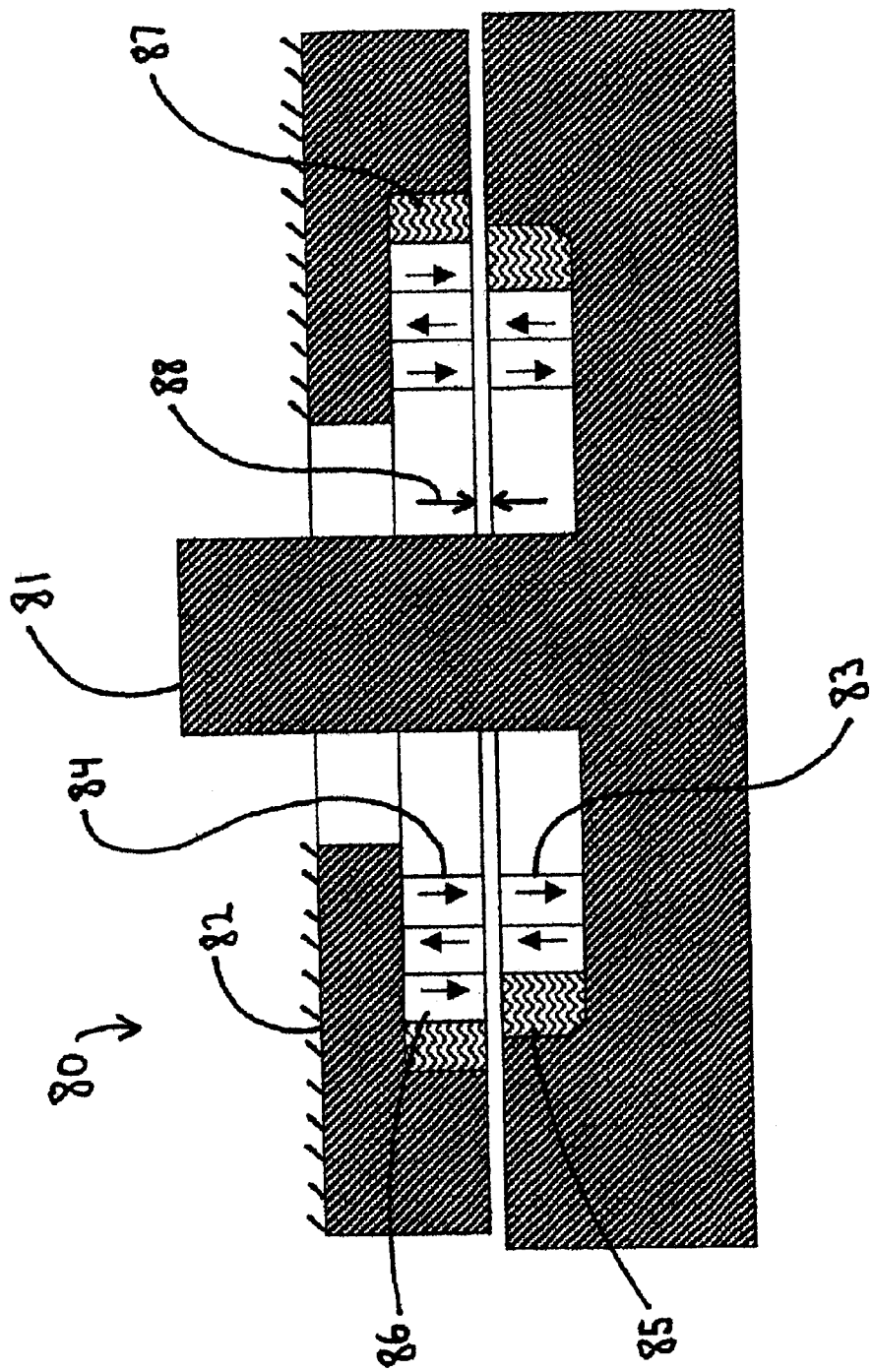
FIG. 8 is a schematic drawing of an alternative preferred configuration passive radial magnetic bearing with intermediate ring and magnetic damper.

An alternative preferred configuration passive radial magnetic bearing with intermediate ring and built-in magnetic damper, shown at 80 in FIG. 8, includes a stator 82 and a rotor 81, each having axially facing portions with cup-like recesses facing each other across an airgap 88. Axially magnetized ring magnet segments 83 are placed inside the rotor cup in an array constituting concentric ring magnets, and a second array of axially magnetized ring magnet segments 84 is placed inside the stator cup, with radially adjacent rings of both arrays alternating in axial polarities and axially aligned ring magnets in the rotor 81 and stator 82 having the same axial polarity. The rotating ring magnets 83 in the rotor 81 cooperate with the stationary ring magnets 84 in the stator 82 to produce axial attraction for supporting the weight of the rotor, and radial centering forces. In this configuration, the rotor ring magnet pieces 83 are surrounded by a magnetic insulator ring 85. The ring 85 is preferably non-magnetic so as to allow a higher radial stiffness by preventing flux from the outer ring magnet shorting around from the cup back to outer cup ring. The insulator ring 85 can also be chamfered on its outer diameter corner so as to facilitate radiusing the inner diameter corner of the cup for higher strength. In one embodiment of the invention, the insulator ring 85 is constructed from a conductive material such as copper and thereby also functions as a radial bearing damper. When used as a damper, flux from an extra stationary damper ring magnet 86 is driven axially across the airgap 88 to produce eddy current damping from radial displacement. Because the magnetic field of the magnets 86 is axis-symmetric, no rotational drag is generated. An outer stationary insulating ring 87 of non-magnetic material may also be used to reduce shorting of the stationary magnets. Other placements of conductive rings and damper magnets exist and could be used in the invention. Placing the conductive ring on the rotor reduces the amount of magnet material required to be rotating and is thus preferable, and the insulating ring 85 may also help distribute the radial load 70 on the magnet segments, as shown in FIG. 6, to minimize the tensile stress resulting from non-uniform radial forces when the rotor rim grows radially. Some added radial stiffness is potentially gained by radial repulsion between the outer ring magnets of the rotor and stator.

Figure 9:
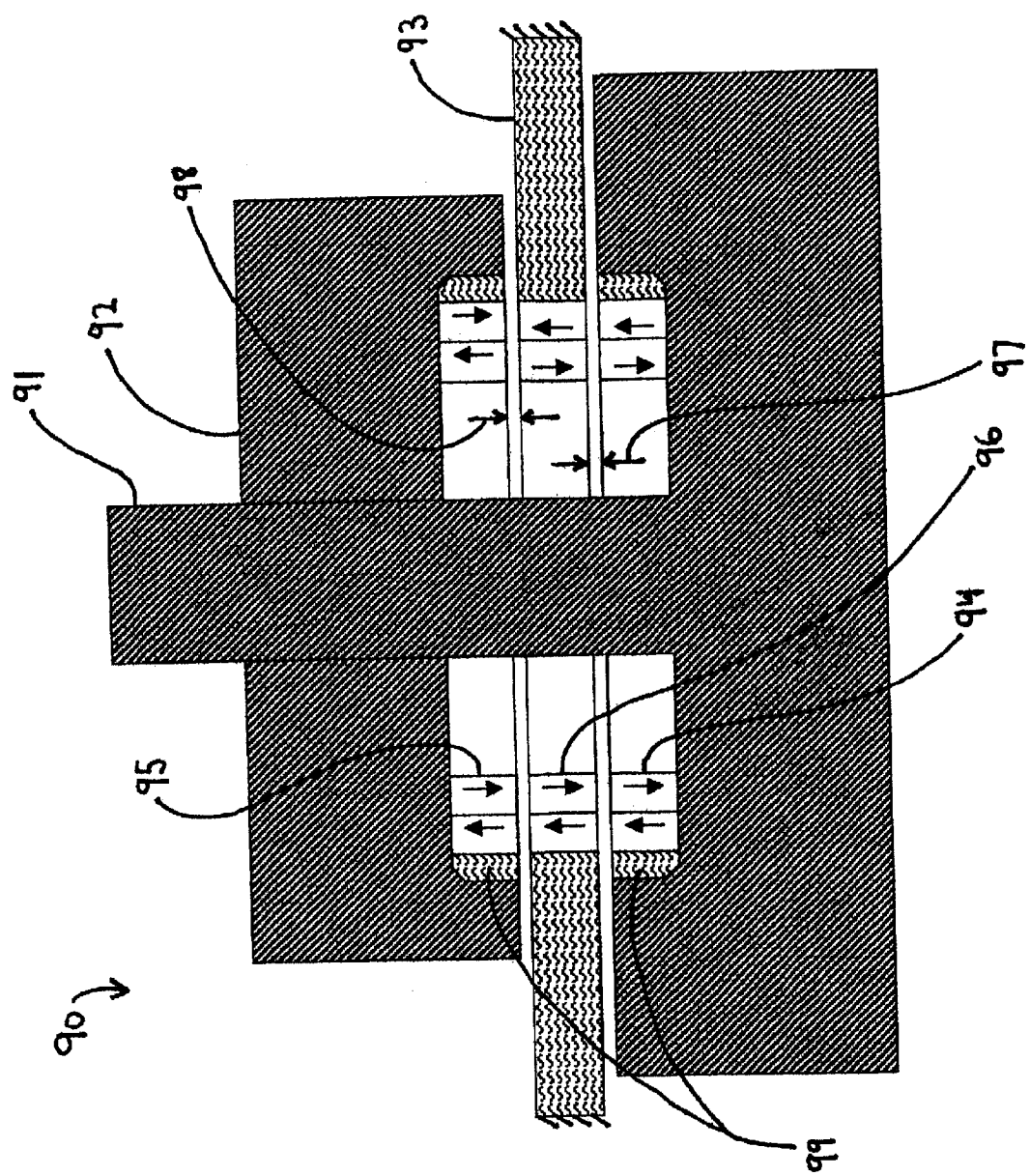
FIG. 9 is a schematic drawing of an alternative preferred configuration passive radial magnetic bearing with two rotating cups.

In applications where the diameter is limited and/or where higher radial stiffness is required, the magnetic bearing radial stiffness can be doubled by adding a second cup that is attached to the shaft, as shown in a magnetic bearing embodiment 90 illustrated in FIG. 9. The magnetic bearing 90 includes a stator 93 sandwiched between upper and lower parts of a rotor 91. The rotor 91 has a lower built-in axial cup structure and an upper rotor bearing cup structure 92 facing together. The rotor portions 91 and 92 have axially magnetized ring magnet arc pieces 94 and 95 inside the inner peripheries of the lower and upper cup structures. Insulating rings 99 are used to prevent magnet shorting. The stator 93 has matching and cooperating ring magnets 96 attached to the inner diameter. In use, the magnetic bearing has two axial airgaps 97 and 98 and generates twice the radial stiffness. The axial forces generated from the rotor portions 91 and 92 tend to cancel each other out when maintained axially centered about the stator 93, assuming identical rotor magnets 94 and 95. If desired, the magnetic bearing can be made to carry axial load by operating with one airgap 97 or 98 smaller than the other or with different height rotor magnets 94 or 95.

Figure 10:
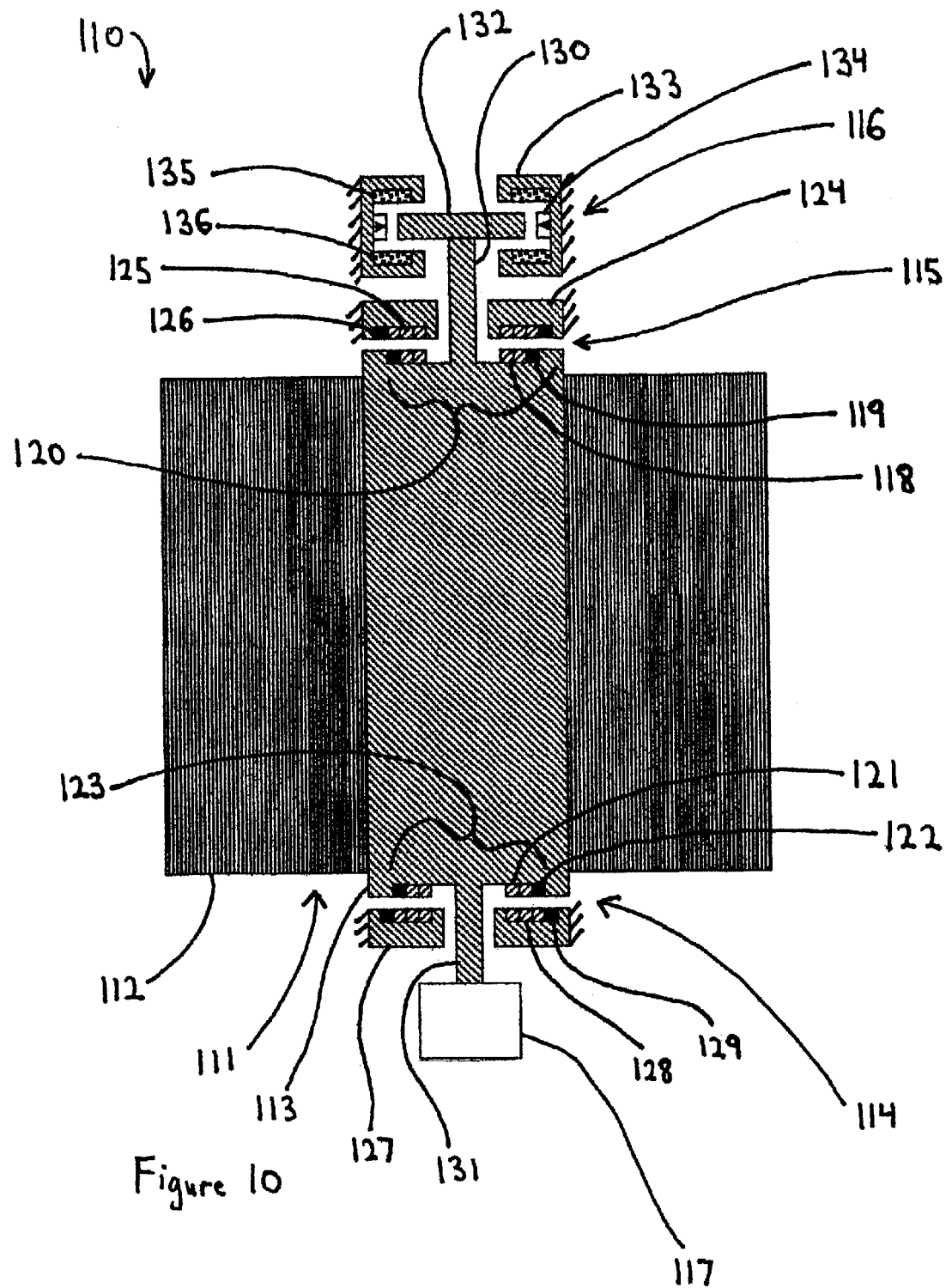
FIG. 10 is a schematic drawing of a fully levitated flywheel energy storage system using passive radial magnetic bearings with active axial control in accordance with the invention.

As shown in FIG. 10, a fully levitated flywheel energy storage system 110 includes a flywheel 111 for storage of energy kinetically. Many designs of flywheels exist and could be used. As shown, the flywheel 111 is constructed with a carbon fiber/epoxy rim 112 press-fit onto a solid steel hub 113. The flywheel 111 is supported for high-speed rotation using lower and upper passive radial and axial magnetic bearings 114, 115 and an active magnetic thrust actuator 116. The flywheel 111 is accelerated and decelerated for storing and retrieving energy through use of a brushless motor/generator 117 attached to a lower shaft 131. The upper and lower passive radial and axial magnetic bearings 115 and 114 are each constructed using two concentric axially magnetized ring magnets 118 and 121 arranged with alternating polarities. The magnets are made up of arc pieces and held inside cup structures 120, 123 on each end of the hub 113. Copper damper/insulator rings 119, 122 are shrink fit or otherwise securely placed inside the cups 120, 123 between the magnets 118, 121 and the inner diameters of the two cups.

The magnetic bearing stators 124, 127 have matching ring magnets 125, 128 that cooperate with the ring magnets 118 and 121 on the rotor to generate axial forces and radial centering forces. Outer stator magnet rings radially outside the rings 125, 128 act upon the damper rings 119, 122 to provide radial damping and insulator rings 126, 129 prevent magnetic shorting. To maintain the axial position of the flywheel for full levitation, the active axial actuator 116 provides axial force to stabilize the system. Many designs of magnetic thrust actuator are known in the art and could be used. As shown, the actuator 116 uses a thrust disk 132 attached to the upper shaft 130. The thrust disk 132 is acted upon by the actuator stator 133, which is constructed of ferromagnetic material such as steel. A radially magnetized permanent magnet provides bias flux and upper and lower coils 135 and 136 provide control. When not activated, the flywheel is typically supported on touchdown bearings, not shown.

Figure 11:
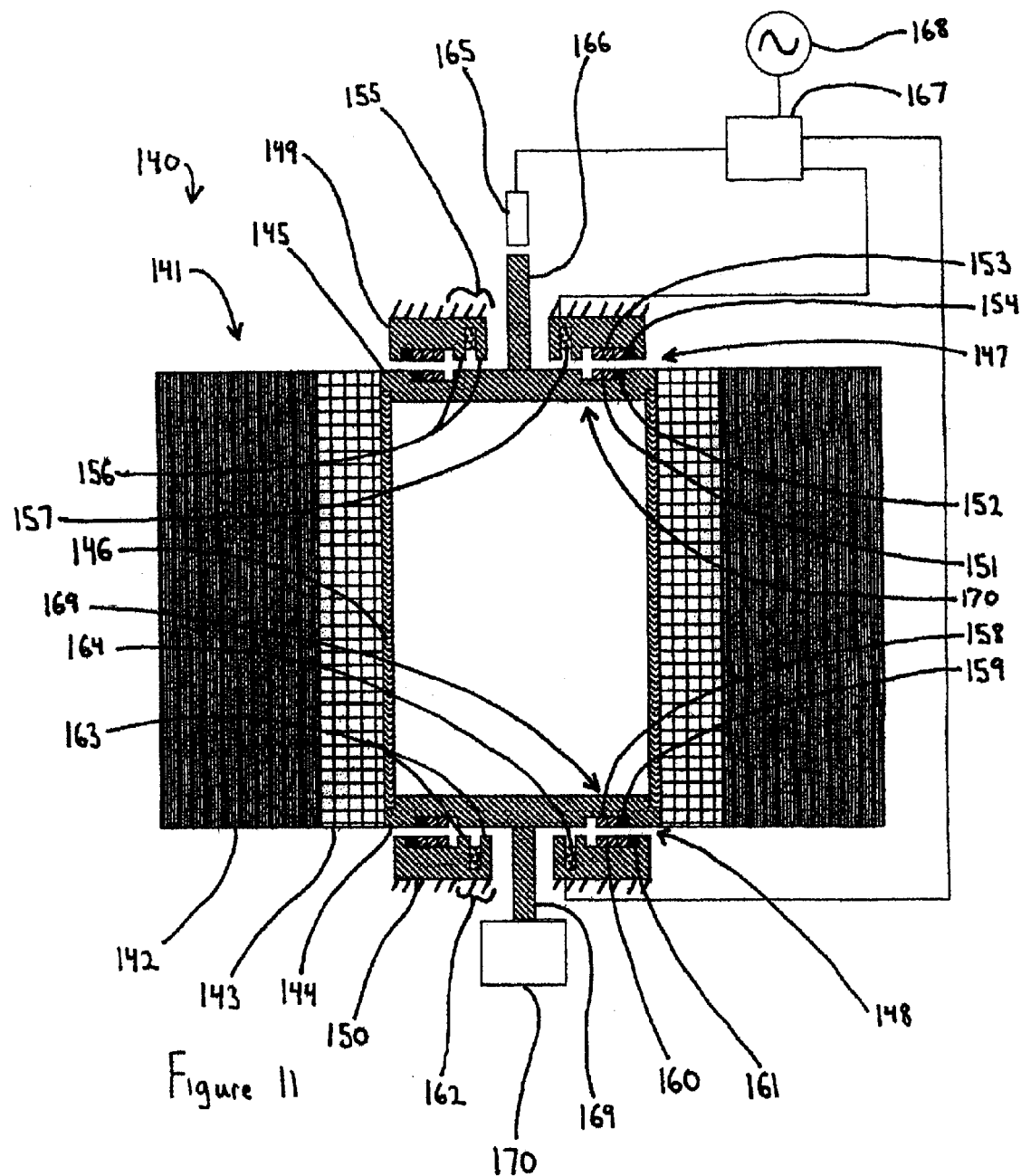
FIG. 11 is a schematic drawing of an alternate configuration of a fully levitated flywheel energy storage system using passive radial magnetic bearings with active axial control in accordance with the invention.

An alternate configuration of a fully levitated flywheel energy storage system 140, shown in FIG. 11, has a combined passive radial and active axial magnetic bearing with an integrated axial actuator. The combined passive radial and active axial magnetic bearing is useful for allowing easier implementation of magnetic bearings for many applications. A levitated object needs only recessed cups machined into the axial faces for receiving the ring magnets used to levitate the object. The flywheel system 140 is comprised of a low cost flywheel 141 made using low cost E-glass/epoxy composite 143 inside carbon fiber/epoxy 142 with steel hub end pieces 144, 145. A tubular expansion member 146 maintains connectivity between the hub end pieces 144, 145 and the flywheel 141. Upper and lower passive radial and axial magnetic bearings 147 and 148 support the flywheel magnetically. The rotor bearing portions include cup structures 169, 170 machined into the axial faces. Axial magnetized ring magnet arc segments 151, 158 are arranged with radially alternating polarity inside the rotor bearing portions 144, 145. Copper insulator/damper rings 152, 159 provide radial damping and magnetically insulate the outer rotating magnets. The bearing stator portions 149, 150 provide axial forces and radial centering forces through cooperating permanent magnet rings 153, 160. Non-magnetic insulator rings 154, 161 reduce shorting of the outer stator ring magnets 153, 160, which can be continuous or also made from arc pieces. The axial position of the flywheel is maintained by upper and lower active actuators 155, 162 that are combined in the same bearing stator structures 149, 150. The actuators 155, 162 include electromagnetic coils 157, 164 along with ferromagnetic poles 156, 163 for generation of axial direction forces with applied electric current. Although not required, it is generally preferable to maintain the flywheel position at the point of metastable equilibrium where the upper bearing axial force is equal to the flywheel weight plus the lower bearing axial force. In this position, the actuator current is essentially zero. The flywheel position is controlled using a controller 167 powered from an external power source 168 or from the flywheel system itself. The controller 167 uses a position sensor 165 directed at the end of the upper shaft 166 and it outputs power to the upper and lower actuators 155, 162. A brushless motor/generator 170 attached to the lower shaft 169 is used for storing and retrieving energy. Many types of flywheel systems exist with different flywheel and motor/generator designs and positions and the invention would be applicable for all such systems. One benefit of the passive radial magnetic bearings of the invention is the generation of maximum radial stiffness per amount of negative axial stiffness. This inherently results in generation of reduced tilt moment instabilities and is favorable for full levitation magnetic bearing systems.

Figure 12:
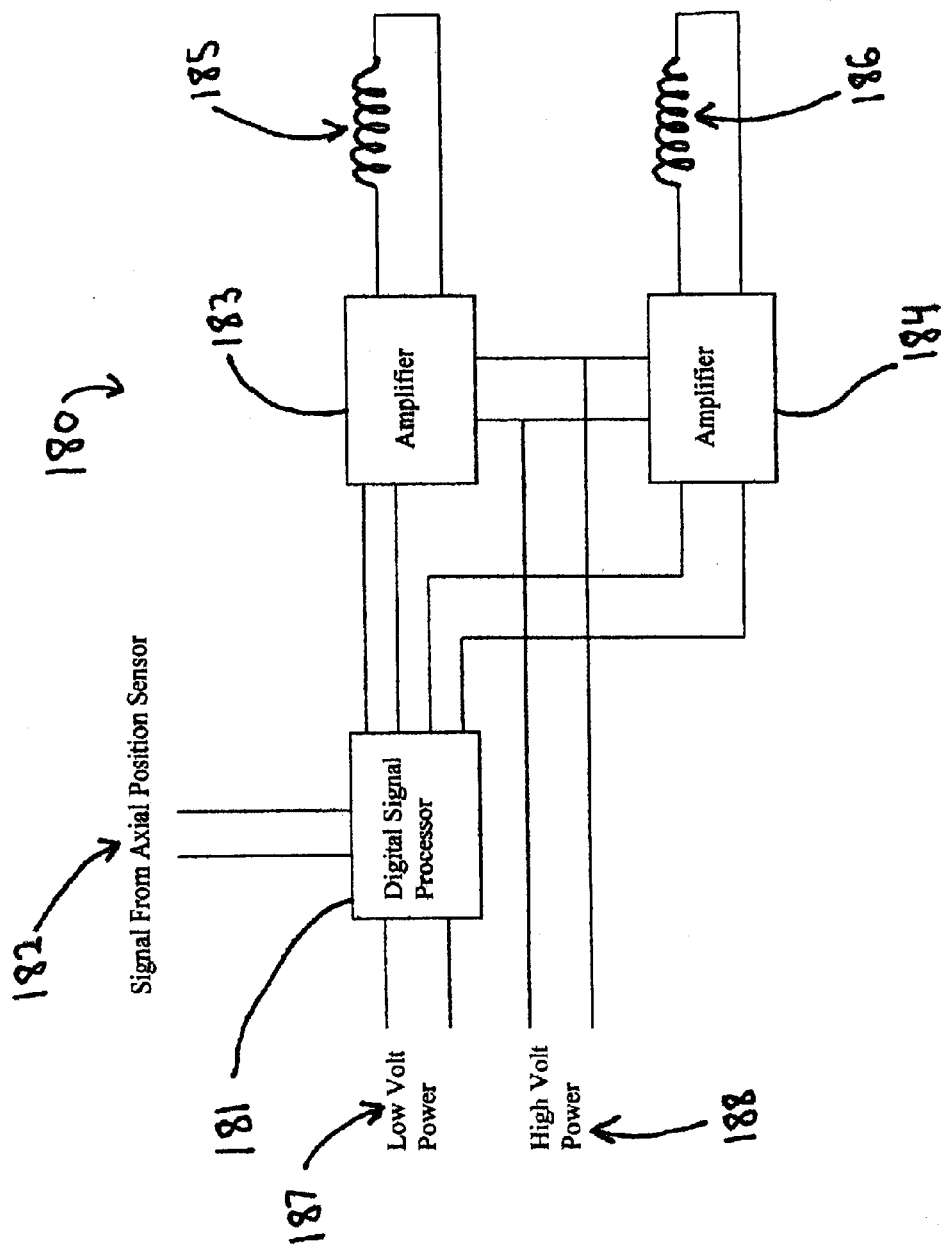
FIG. 12 is a schematic diagram of a preferred electrical circuit for providing axial control in a full levitation magnetic bearing system with opposing electromagnetic coils.

The control of the magnetic bearing system can be done with analog circuits or sometimes is preferably done with digital circuitry for repeatable manufacturing without tuning and lower cost. One control circuit 180 is shown in FIG. 12 where two output amplifiers are used with two separate actuator coils. A digital signal processor (DSP) 181 takes the input position signal 182 from the axial position sensor, such as the sensor 165 shown in FIG. 11. The DSP 181 then outputs selectively to either one of two separate amplifiers 183 and 184, which separately control the top and bottom coils 185, 186. The DSP 181 operates from a low voltage supply 187 and the amplifiers from a high voltage supply 188. The control of the magnetic bearing system is nonlinear. It can be made linear by applying a continuous amplifier offset current to the coils 185, 186 to create bias flux in both actuators. Other methods for axial control can be employed including other actuators and other electrical circuits.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims.

Wherein I claim:

1. A magnetic bearing system for support of a rotating body having a center of mass about a substantially vertical axis of rotation through said center of mass, said bearing system comprised of a rotating portion and a stationary portion on each axial side of said center of mass;

said rotating portions include of two or more concentric axially magnetized ring poles on an axial surface of the rotating body and arranged with radially alternating magnetic polarities;

said rotating ring poles are constructed of multiple, circumferentially-adjacent, individual permanent magnet pieces;

said rotating magnet pieces number at least four and are contained inside a containment cup having a rim and a web, and are axially held in said cup by magnetic attraction to said web and are radially supported by said rim;

said stationary portions are comprised of two or more concentric axially magnetized poles of permanent magnet material that cooperate with said rotating ring magnets to produce both an axial attractive force and a radial centering force.

2. A magnetic bearing system as described in claim 1, further comprising:

an active axial magnetic actuator for positioning said rotating body relative to said stationary portions whereby said rotating body is fully levitated.

3. A passive radial magnetic bearing as described in claim 1, further comprising:

a motor for driving said rotating body to a rotation speed such that said outer ring pole rotates with a peripheral speed greater than 150 m/sec in normal operation.

4. A passive radial magnetic bearing as described in claim 3 wherein:

said rotating body includes an energy storage flywheel.

5. A passive radial magnetic bearing as described in claim 1 wherein said containment cup metal is ferromagnetic.

6. A passive radial magnetic bearing as described in claim 5 wherein said containment cup is constructed of steel.

7. A passive radial magnetic bearing as described in claim 5, wherein:

said web has an axial thickness equal to or greater than twice the axial thickness of said rotating permanent magnet pieces.

8. A passive radial magnetic bearing as described in claim 1 further comprising:

a non-ferromagnetic ring radially between the outer diameter of said rotating permanent magnets and the inner diameter of said cup.

9. A passive radial magnetic bearing as described in claim 8, wherein:

said ring has a radial elastic modulus that is lower than the elastic modulus of said permanent magnets.

10. A passive radial magnetic bearing as described in claim 8, wherein:

said ring is made of an electrically conductive material that provides radial magnetic damping when said rotating body has a radial perturbation.

11. A magnetic bearing system as described in claim 1 wherein said containment cups are made integral with said rotating body.

12. A magnetic bearing system for support of a rotating body about an axis of rotation, comprising:

a rotating portion and a stationary portion;

said rotating portion includes at least two concentric axially ring magnets disposed around a circumference of an axial surface of said rotating body and arranged with radially alternating magnetic polarities, said rotating ring magnets are constructed of multiple individual permanent magnet pieces around said circumference, said rotating magnet pieces are contained inside a containment cup, having a rim portion and a web portion;

said rotating magnet pieces are magnetically attracted to said web;

said stationary portions include two or more concentric axially magnetized poles of permanent magnet material that cooperate with said rotating ring magnets to produce both an axial attractive force and a radial centering force.

13. A passive radial magnetic bearing as described in claim 12 wherein the number of individual ring magnet pieces around the circumference exceeds seven.

14. A passive radial magnetic bearing as described in claim 12 wherein said rotating portion includes two cups and sets of magnet pieces arranged such that they act upon opposite axial sides of said stationary portion.

15. A passive radial magnetic bearing as described in claim 12, further comprising:

a motor coupled to said rotating body for driving said rotating body to a speed of rotation wherein the outer diameter of the outer rotating permanent magnet ring rotates at a maximum operating peripheral speed that is greater than 200 m/sec.

16. A passive radial magnetic bearing as described in claim 12 wherein said web is more than twice the axial thickness of the rotating permanent magnet pieces axially behind the rotating permanent magnet pieces.

17. A magnetic bearing system as described in claim 12, further comprising:

a non-ferromagnetic ring radially between the outer diameter of the rotating magnet pieces and the inner diameter of the cup.

18. A magnetic bearing system for an energy storage flywheel, comprising:

a passive radial magnetic bearing having a rotor portion and a stationary portion with said rotor portion attached to said flywheel;

said rotor portion is constructed of multiple individual axially magnetized permanent magnet pieces around an axial circumference of said rotor;

said permanent magnet pieces are contained inside a containment cup having a rim and a web;

said permanent magnet pieces are magnetically attracted axially to said web and are centrifugally contained by said rim;

said stationary portion is comprised of an axially magnetized permanent magnet ring that cooperates with said rotating ring magnets to produce both an axial attractive force and a radial centering force.

19. A magnetic bearing system for an energy storage flywheel as described in claim 18 wherein:

said flywheel rotates about a substantially vertical axis and is fully levitated with one said passive radial magnetic bearing on each axial end of said flywheel and an active axial magnetic bearing to provide axial positioning.

20. A magnetic bearing system for an energy storage flywheel as described in claim 19 wherein:

said flywheel is constructed of steel and one said cup is machined into each axial end of said flywheel.

21. A magnetic bearing system for an energy storage flywheel as described in claim 18 wherein:

at least two concentric poles of permanent magnet pieces with radially alternating polarities are contained in said cup.

22. A process for fully magnetically supporting a high speed rotor for rotation about a substantially vertical axis comprising:

rotating a containment cup, including a rim portion and a web portion, attached to an axial surface of said rotor, axially opposite and closely adjacent to a stator;

magnetically attracting two or more concentric axially magnetized ring poles, to said web, and radially supporting said magnets against centrifugal force with said rim, wherein said ring poles are arranged with radially alternating magnetic polarities, and each ring pole is made of at least four individual circumferentially adjacent rotating permanent magnet pieces;

said rotating ring magnets cooperating with said stationary portions comprised of two or more concentric axially magnetized poles of permanent magnet material to produce both an axial attractive force and a radial centering force; and axially balancing said rotor with an active axial magnetic bearing.

* * * * *